Sept. 17, 1946.　　　　G. W. NEWMAN　　　　2,407,897
POCKET KNIFE
Filed July 9, 1945
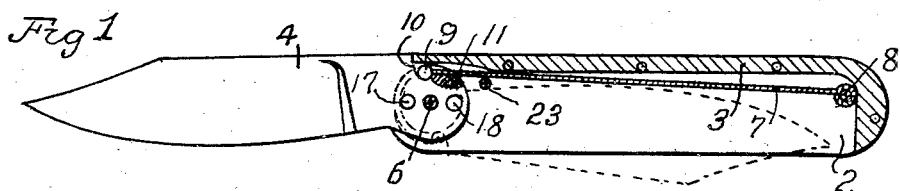
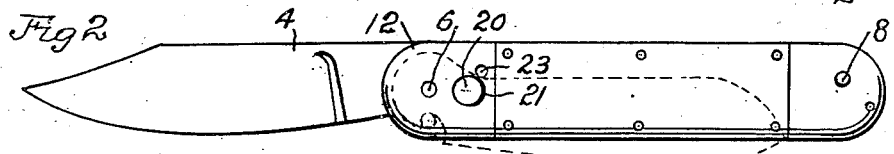
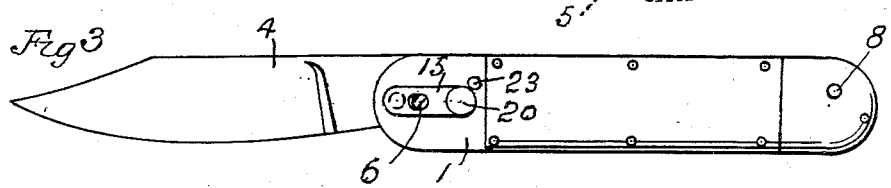
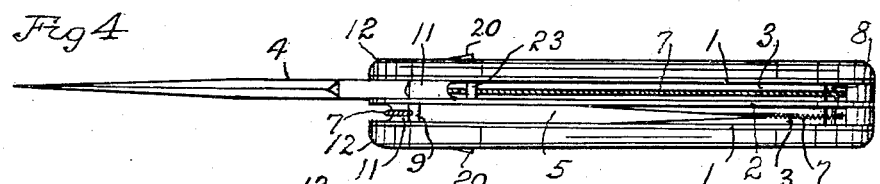
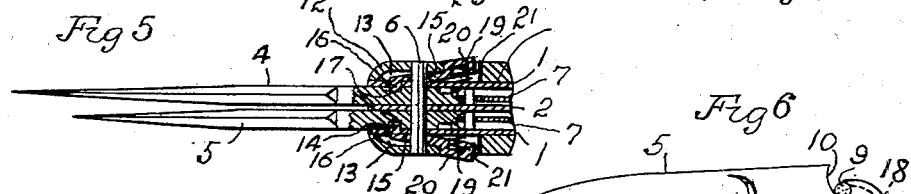
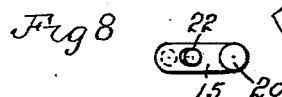
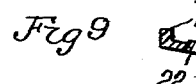
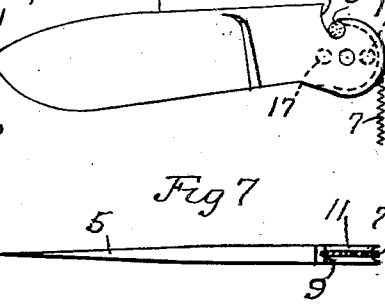
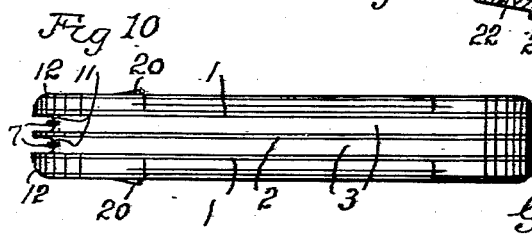
Inventor
George W. Newman
Warren D. House
By
His Attorney Patented Sept. 17, 1946

2,407,897

UNITED STATES PATENT OFFICE 2,407,897

POCKETKNIFE

George W. Newman, Kansas City, Mo.

Application July 9, 1945, Serial No. 603,871

1 Claim. (Cl. 30—159)

My invention relates to improvements in pocket knives.

One of the objects of my invention is the provision of a novel spring actuated means by which the blade of the knife is automatically swung, when released, from the closed to the extended open position.

Another object of my invention is the provision of novel means, manually releasable, for locking the blade in both the closed and open positions.

Another object of my invention is the provision of novel means for limiting the closing movement of the blade to a position in which its cutting edge will be spaced from and held from contact with any object.

Still another object of my invention is the provision of a novel handle structure which will permit of the employment of a plurality of blades in the handle, which blades may be automatically spring opened.

The novel features of my invention are hereinafter fully described and claimed.

In the accompanying drawing which illustrates a preferred embodiment of my invention, Fig. 1 is a side view showing one blade in solid lines in elevation in the open position and in dotted lines in the closed position, parts being shown in vertical section.

Fig. 2 is a side elevation of the knife shown in Fig. 1, the longer blade being shown in solid lines in the open position, and the shorter blade being shown in dotted lines in the closed position.

Fig. 3 is a side elevation of the same knife, with one of the side end caps removed, the long blade being shown opened.

Fig. 4 is a front view of what is shown in Fig. 2.

Fig. 5 is a front view of one end portion of the knife shown in Figs. 1 to 4, parts being shown in elevation and parts in vertical section, the two blades being shown locked in their open positions.

Fig. 6 is a side elevation of the shorter blade and a part of the spring which opens it shown attached to the blade.

Fig. 7 is a back edge view of what is shown in Fig. 6.

Fig. 8 is an outside plan view of one of the locking levers.

Fig. 9 is a longitudinal section of the locking lever shown in Fig. 8.

Fig. 10 is a back view of the knife shown in the other views, showing both blades closed.

Similar characters of reference designate similar views in the different views.

The knife illustrated in the drawing is a two bladed knife the blades and handle of which, in general structure, correspond to the usual two bladed knife.

The handle comprises two longitudinal parallel lining plates 1 and an intermediate lining plate 2 between and spaced from the lining plates 1. Fastened to and between the outer lining plates 1 and the inner lining plate 2 are the usual back plates 3. The lining plates 1 and 2 and back plates 3 form two longitudinal recesses open at one set of ends and closed by the back plates 3 at the other set of ends, and adapted to respectively receive two blades 4 and 5, which are pivoted in the open ends on a transverse pivot pin 6, which extends through the three lining plates 1 and 2, as shown in Fig. 5.

For automatically swinging each of the blades 4 and 5 to the open extended position from the closed position, two longitudinal coiled springs 7 have their rear ends fastened to a pin 8 extending transversely through the lining plates 1 and 2.

As shown in Fig. 4 the springs 7 extend respectively forwardly from the pin 8 in the two channels between the lining plates 1 and the lining plate 2. The front end of each spring 7 is fastened to the pin 9 removably mounted in a recess 10 at the rear side of the back end of the blade where it hits the front end of the adjacent back plate 3, Figs. 1 and 4.

The rear end of the butt of each blade is provided with an arcuate recess 11, extending from the recess 10 approximately 180 degrees, to receive the adjacent spring 7, when the blade is swung to the closed position, as the blade 5, Fig. 4.

When the blade, as the blade 4, Fig. 1, is swung from the extended open position shown in solid lines in Fig. 1 to the dotted closed position, the spring 7 attached to said blade will be wound on the arcuate grooved end of the butt of the blade and its tension increased. In any position of the blade, the spring will exert its pull at approximately ninety degrees angle to the transverse plane of the axis of the blade, so will always exert a maximum pulling effect tending to swing the blade open.

Two means are respectively provided for releasably locking the two blades in their open and their closed positions.

The two front end cap plates 12, fastened to the outer sides respectively of the outer lining plates 1, have between them and the lining plates two chambers 13. Respectively through the lining plates 1, forward of the pivot pin 6, are two holes 14 respectively communicating with the chambers 13.

Respectively mounted in the chambers 13 are two locking levers 15 pivoted on the outer sides of the lining plates 1 and having each at its forward end in inwardly extending projection 16 adapted to extend and project inwardly through the adjacent hole 14 of the adjacent lining plate 1.

Each of the blades 4 and 5 has in the outer side of its butt end two locking recesses 17 and 18, at diametrically opposite sides of and equally spaced from the pivot pin 6. The recess 17 will register with the adjacent hole 14 when the blade is in the open extended position, as in Fig. 5, and the recess 18 will register with said hole 14 when the blade is in the closed position.

When either lever 15 is in the locking position, shown in Fig. 5, its locking projection 16 will extend through the adjacent hole 14 and into the locking recess 17, if the blade is in the open position, and it will extend into the recess 18, if the blade is closed, thereby enabling the locking lever to lock the adjacent blade in either the open or the closed position.

For normally forcing the levers 15 to the locking position, two coil springs 19 bear against the outer sides of the lining plates 1 in the chambers 13 at the rear of the pivot pin 6. The rear ends of the levers 15, each has at its outer side an outwardly projecting portion 20 which normally extends outwardly through a hole 21 in the end cap 12, which hole communicates with the adjacent chamber 13 and with the atmosphere.

The operator by pressing inwardly the portion 20 of either locking lever 15, against the pressure of the adjacent spring 19, will swing the lever to the unlocked position, in which its locking projection 16 will be withdrawn from the locking recess 17 or 18, depending upon which is in register with the hole 14.

For retaining each lever in its operative position in its chamber 13, it is provided between its ends with an inwardly tapering hole 22, Figs. 8 and 9, through which extends the pivot pin 6.

To limit the inward closing of the blades 4 and 5, so that their cutting edges will be spaced from and not strike the adjacent back plates 3, a pin 23 extends transverse through the lining plates 1 and 2 in a position in which it will be in the path of the front sides of the butt ends of the blades 4 and 5, and will limit the inward closing to a position in which the cutting edge of each blade will be spaced from the back plates 3, as shown in solid and dotted lines in Figs. 1 and 2.

In the operation of the device, assuming the blades 4 and 5 to be closed, as in Fig. 10, if the operator depresses the projecting portion 20 of either lever 15, the locking projection of said lever will be withdrawn from the locking recess 18 of the adjacent blade, at the time in register with the hole 14, and the spiral spring 7 attached to said blade will swing it to the open position in which the rear end of the back of the blade will strike the front end of the adjacent back plate 3, limiting the opening movement, at which time the recess 17 will register with the locking projection 16 of the blade, and when the operator releases the pressure on the portion 20 of the locking lever, the adjacent spring 19 will swing the lever to its normal closed position, locking the blade in the open position.

To close the blade, the operator again depresses the portion 20 of the lever, and swings the blade by hand back to its closed position, at which time the adjacent spring 7 will be wound on the butt end of the blade, and, on releasing the lever, its projection 16 will enter the recess 18 and lock the blade from opening.

Many modifications of my invention, within the scope of the appended claim, may be made without departing from the spirit of my invention. Thus by eliminating one of the blades and its operating means, the knife may be made with a single blade. Or, if desired, both ends of the knife may be made as shown in Fig. 5, providing a four bladed knife, in which case, the two spiral blade swinging springs 7 could have their opposite ends respectively fastened to and adapted to be wound on the butt ends of alined blades, and the anchoring pin 8 omitted.

What I claim is:

In a pocket knife, in combination with a handle having two parallel longitudinal lining plates, a cap end plate fastened to the outer side of one of said lining plates and forming therewith at its inner side a chamber, said one lining plate having through it a hole communicating with said chamber, said cap end plate having a hole therethrough communicating with said chamber and the atmosphere, and a pivot pin extending through said lining plates and said cap end plate, of a blade pivoted at its butt end on said pivot pin between said lining plates and adapted to swing approximately 180 degrees on said pivot pin to an extended open position and to a closed position, the side of said butt end next said lining plate having said hole having in it two locking recesses at diametrically opposite sides of said pivot pin and equally spaced therefrom and positioned to alternately register with said hole in said lining plate when said blade is in the fully open and fully closed positions, a locking lever in said chamber pivoted between its ends against said one lining plate and having at one end on its inner side a locking projection adapted to extend through said hole in said lining plate into the said recess in said butt end which at the time registers with said hole in said lining plate and having at its other end and outer side a manually depressible portion normally extending into said hole in said end cap, and, when so depressed, swinging said lever to its unlocked position in which said locking projection will be withdrawn from said registering recess, said lever having through it between its ends a tapering hole through which said pivot pin extends, and means normally forcing said lever to its locking position.

GEORGE W. NEWMAN.